Oct. 11, 1932.  A. L. ELLIS  1,882,004
DRIVING MECHANISM
Filed Oct. 29, 1930   5 Sheets-Sheet 1
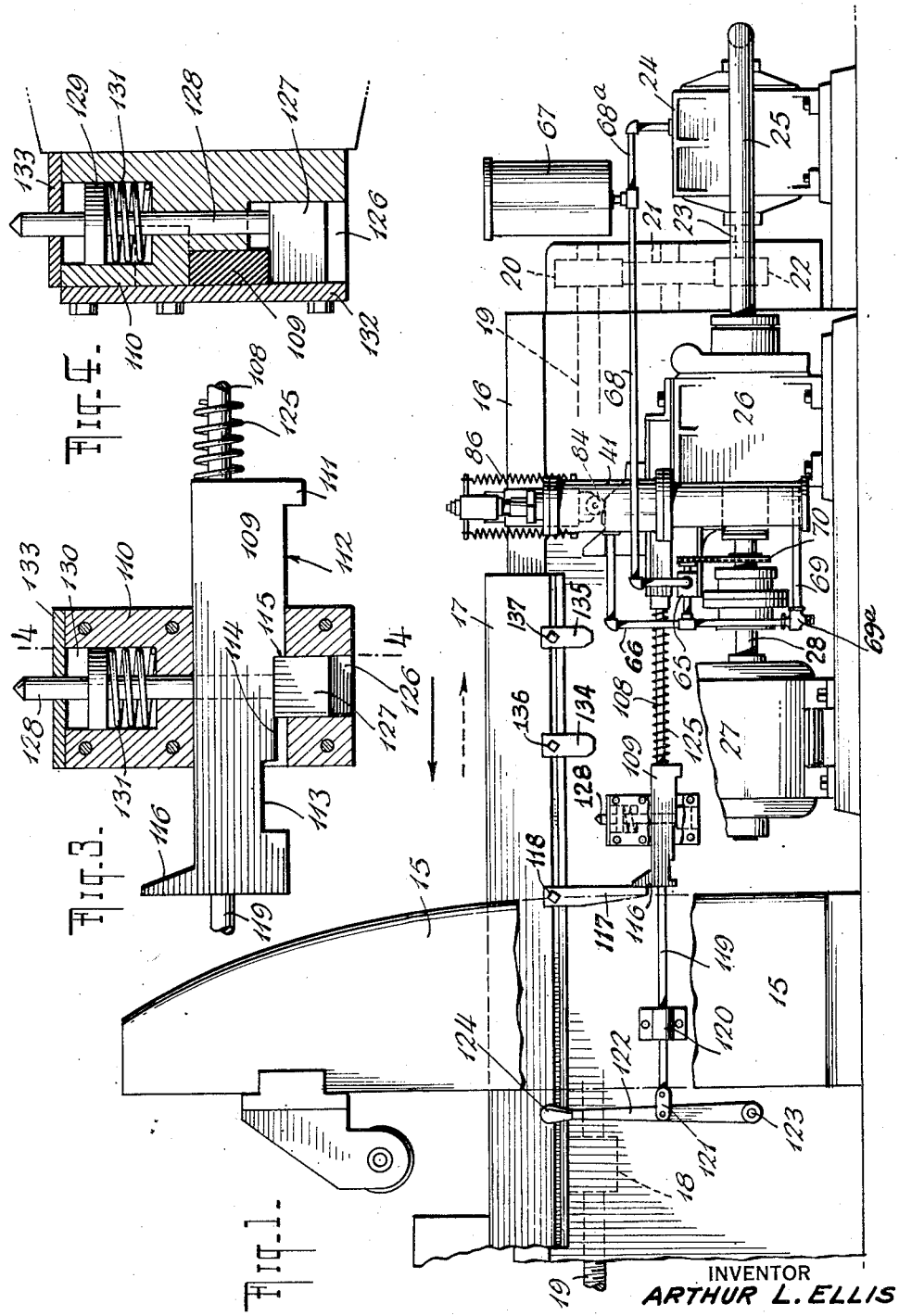
INVENTOR
ARTHUR L. ELLIS
BY
ATTORNEYS Oct. 11, 1932.  A. L. ELLIS  1,882,004
DRIVING MECHANISM
Filed Oct. 29, 1930  5 Sheets-Sheet 2
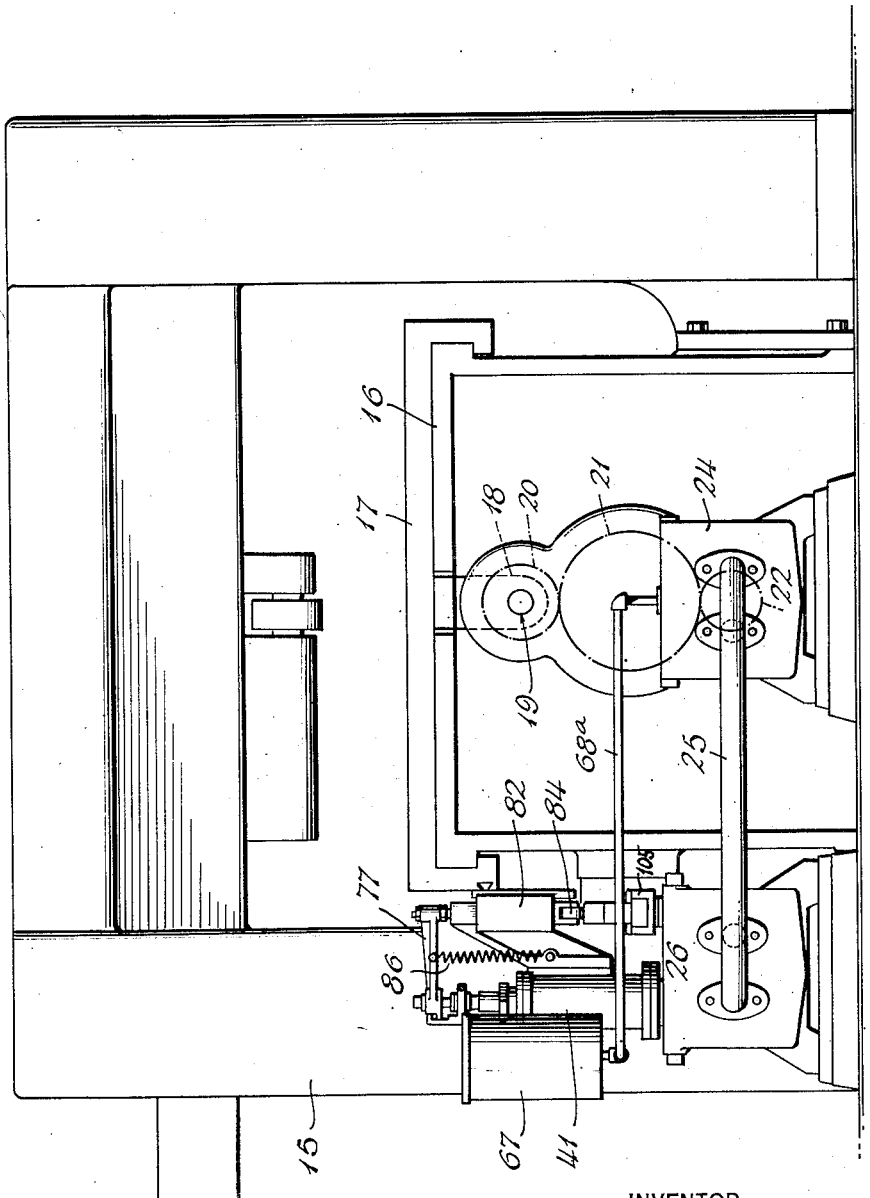
INVENTOR
*ARTHUR L. ELLIS*
BY
ATTORNEYS Oct. 11, 1932.　　　　A. L. ELLIS　　　　1,882,004
DRIVING MECHANISM
Filed Oct. 29, 1930　　5 Sheets-Sheet 3
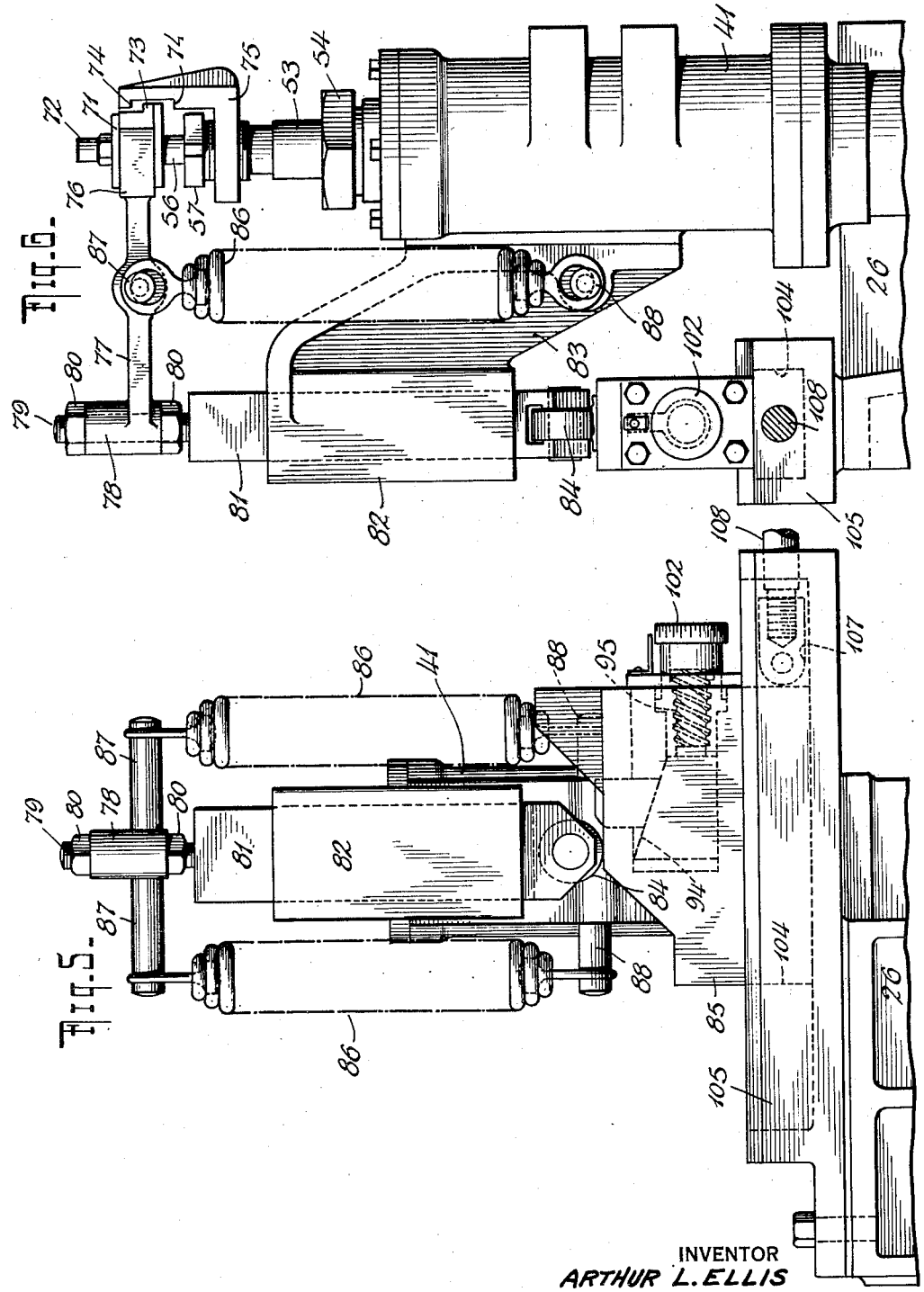
INVENTOR
ARTHUR L. ELLIS
BY
ATTORNEYS Oct. 11, 1932.  A. L. ELLIS  1,882,004

DRIVING MECHANISM

Filed Oct. 29, 1930   5 Sheets-Sheet 4

INVENTOR
ARTHUR L. ELLIS
BY
ATTORNEYS

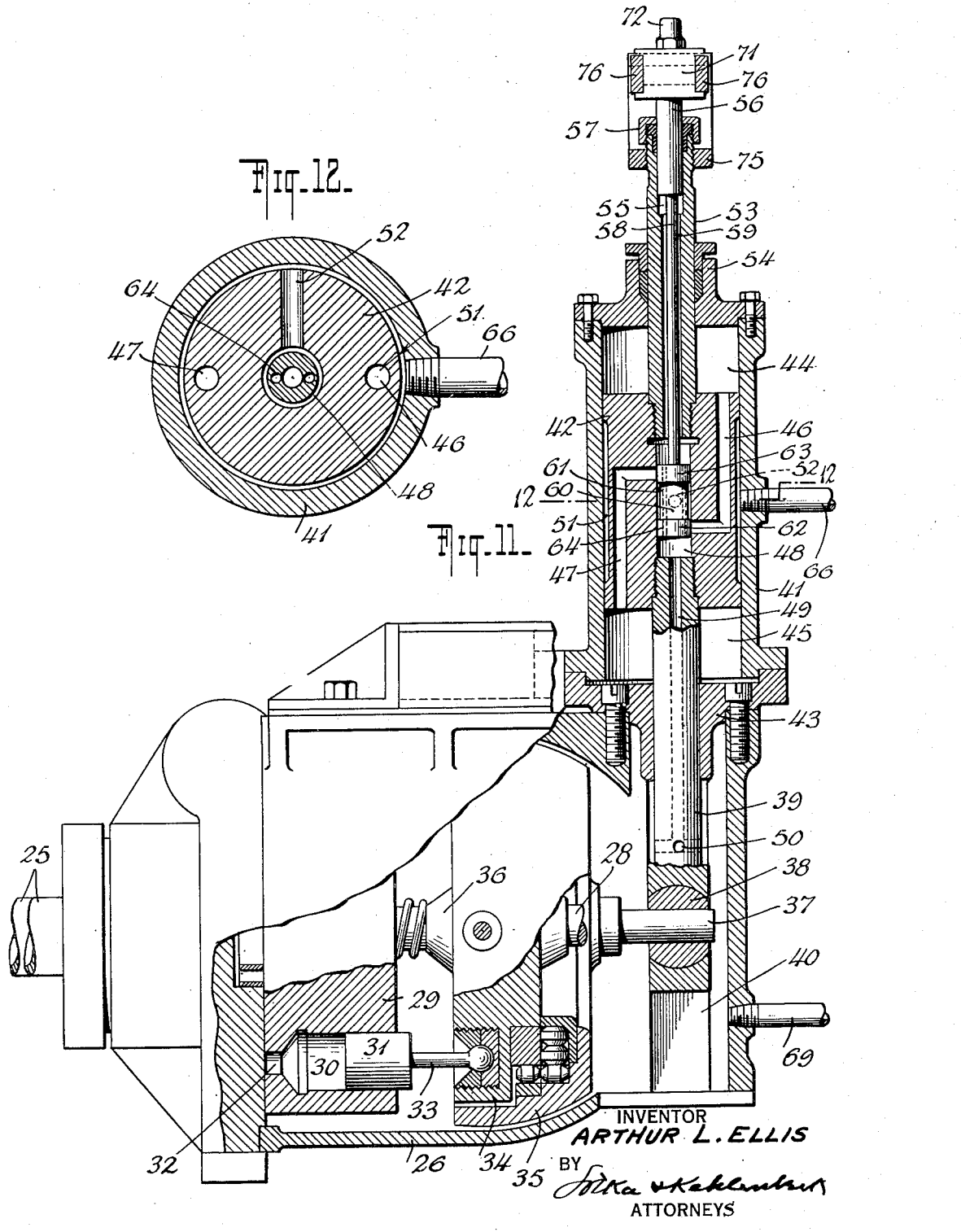

Patented Oct. 11, 1932

1,882,004

UNITED STATES PATENT OFFICE

ARTHUR L. ELLIS, OF NEW ROCHELLE, NEW YORK, ASSIGNOR TO THE WATERBURY TOOL COMPANY, OF WATERBURY, CONNECTICUT, A CORPORATION OF CONNECTICUT

DRIVING MECHANISM

Application filed October 29, 1930. Serial No. 491,911.

The invention relates to driving mechanisms and more particularly hydraulic driving mechanisms for machine tools of that class wherein the work is carried to the tool upon a reciprocating table as in milling machines, the planers and the like, or to machine tools of the type which include a reciprocating member, as for example, the ram of a broaching machine, drilling machine, shaper and the like, whereby the cutting tool or its equivalent is moved through or across the work.

In machines of the kind referred to above the tool or its equivalent generally performs its cutting or other operative action on one traverse or stroke of the reciprocating table or member and is inactive on the reverse traverse, or, as it is commonly termed, the return stroke.

The object of the present invention is to provide a novel and improved hydraulic driving mechanism whereby the operation of the tool or its equivalent is effected with maximum efficiency, and whereby said tool or equivalent element is effectively controlled in accordance with any predetermined operative variations as to speed of travel etc. which may be required to provide maximum efficiency. Other more specific objects will appear from the description hereinafter and the features of novelty will be pointed out in the claims.

Figure 8:
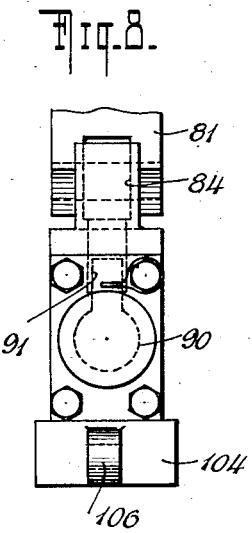
Figure 7:
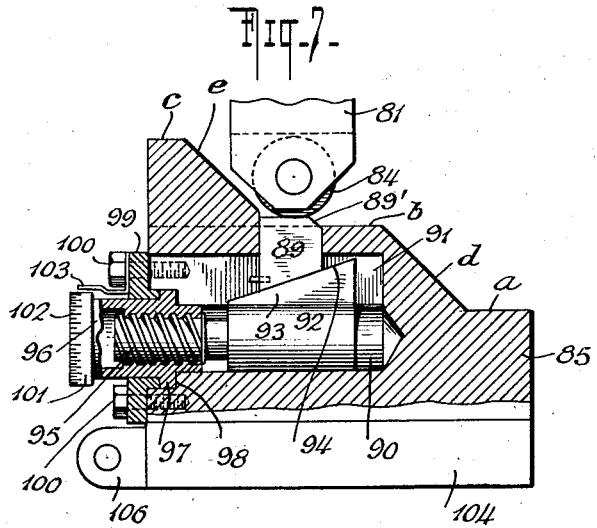
Figure 9:
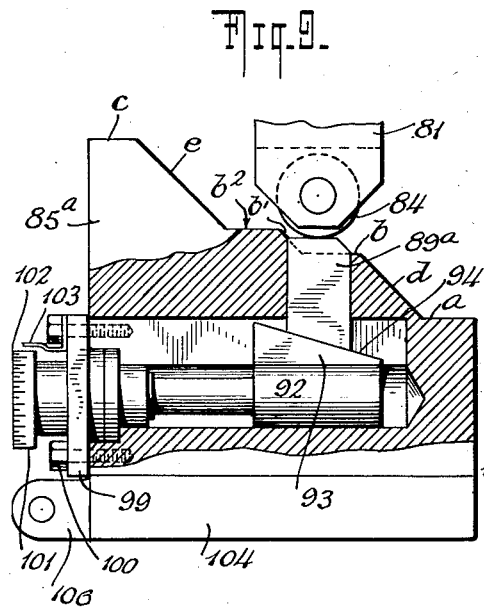
Figure 10:
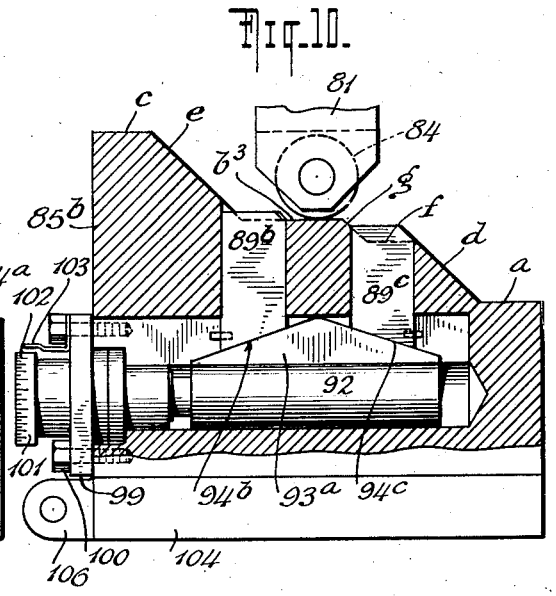

In the accompanying drawings, which illustrate an example of the invention without defining its limits, Fig. 1 is a fragmentary side elevation of a milling machine embodying the novel driving mechanism; Fig. 2 is an end elevation thereof; Fig. 3 is a sectional elevation of a portion of the control means forming part of the mechanism; Fig. 4 is a section on the line 4—4 of Fig. 3; Figs. 5 and 6 are fragmentary elevations, looking at right angles to each other, of other portions of said control means; Fig. 7 is a fragmentary sectional elevation of a portion of the control means with the parts in different positions; Fig. 8 is an end view thereof; Figs. 9 and 10 are fragmentary sections showing two different forms of the aforesaid portions of the control means; Fig. 11 is an elevation, partly in section of the hydraulic pump included in the driving mechanism; and Fig. 12 is an enlarged section on the line 12—12 of Fig. 11.

As an example of its utility and for the purpose of illustration and description the invention has been shown as embodied in a conventional milling machine, it being understood that this is not to be construed as defining the limits of the novel driving mechanism; the latter is obviously capable of use with equal efficiency in connection with planers or other machines which include reciprocating tables or with broaching machines, drilling machines, shapers and other machines including reciprocating members as exemplified for instance by the ram of a broaching machine.

In the illustrated examples 15 represents the frame or support of a milling machine of any existing type which includes horizontal guiding means 16 for guiding a reciprocating table 17 in its reciprocal movements, said table 17, as is customary, serving to carry the work to the tool. The milling machine, or its equivalent, may include any and all features commonly found therein, or it may be of any special construction, and said machine has accordingly been shown only in a fragmentary way, as per se, it forms no part of the present invention. As shown in the drawings, the table 17 is provided on its lower face with a depending nut 18 in screwthreaded engagement with an operating screw 19 which extends lengthwise beneath the table and is suitably journalled in conventional bearings in the well known way. The operating screw 19 is in operative connection with the driving mechanism, for instance, by being provided with a gear 20 which meshes an intermediate gear 21 suitably journalled upon the frame 15 of the machine. The gear 21 in turn is in mesh with a gear 22 located upon the shaft 23 of the motor unit 24 of the hydraulic driving mechanism which may be of any suitable existing type. The motor unit 24 is connected by pipes 25 with the pump unit 26 of said hydraulic driving mechanism, said pump unit 26 being operated in any conventional manner, as by means of an electric motor 27 connected with the driving shaft 28 of said pump unit 26 as shown in Fig. 1.

The motor 24 and pump 26 shown in the illustrated example are of the well known Waterbury type and correspond in construction with each other, excepting as hereinafter pointed out. Both units comprise casings or housings in which rotatable cylinder barrels 29 are mounted upon the shafts 23 and 28 respectively. As shown in Fig. 11 the barrels 29 are provided with a plurality of cylinders 30 in which pistons 31 are slidably mounted, the cylinders each having a port 32 adapted to communicate in periodic succession with suction and pressure ports with which said motor 24 and pump 26 are provided in the well known way; the suction and pressure ports of the units 24 and 26 are connected with each other by the pipes 25 in the conventional manner so that the operation of the pump 26 will develop a corresponding operation in the motor 24. The pistons 31 are connected by piston rods 33 with swash plates 34 rotatably mounted in tilting boxes 35 and connected by means of univerasl joints 36 with the shafts 23 and 28 respectively. As so far described the construction of the motor 24 and pump 26 are identical with the exception that in the motor 24 the tilting box and swash plate may occupy a fixed inclined position with respect to the shaft 23 while in the pump 26, the tilting box 35 and swash plate 34 are adjustable to different angular positions relatively to the shaft 28 in order to vary the output of the pump 26 and thereby vary the speed of the hydraulic driving mechanism as will be more fully pointed out hereinafter. For the purpose of adjusting the position of the swash plate 34 and tilting box 35 of the pump 26, the tilting box 35 is provided with a stub shaft 37 which fits into a rocking bearing 38 provided in a control shaft 39; the latter is vertically guided in a suitable guideway 40 provided in the casing of the pump 26 as illustrated in Fig. 11.

In order to facilitate the adjustment of the swash plate 34 and tilting box 35 of the pump 26, the actuation of the control shaft 39 is preferably effected by means of a servo-motor 41 which in the illustrated example is mounted directly upon the casing of the hydraulic pump 26 as shown in Fig. 11. The servo-motor 41 may be of any conventional type and as illustrated comprises an upright cylinder in which a piston 42 is slidably mounted, and is connected with the one end of the control shaft 39; the latter projects into the cylinder of the servo-motor 41 and is slidably guided in an adapter 43. The piston 42 divides said cylinder into independent upper and lower chambers 44 and 45 respectively, and itself is formed with longitudinal conduits 46 and 47, the first of which opens to the chamber 44 while the second opens to the chamber 45.

The conduits 46 and 47 are connected by means of lateral branches with opposite end portions of a valve chamber 48 formed by a central bore in the piston 42 as illustrated in Fig. 11. The valve chamber 48 also communicates with one end of a channel 49 extending longitudinally of the control shaft 39 and connected at its opposite end, through transverse channels 50 with the interior of the casing of the pump 26.

On its outer surface the piston 42 is cut away or reduced between its ends to form an annular passageway 51 between itself and the cylinder of the servo-motor 41 as shown in Fig. 11; this annular passageway 51 is connected by means of a radial channel 52 with the valve chamber 48 approximately at the middle point of the latter as indicated in Figs. 11 and 12. A sleeve 53 is connected with and projects upwardly from the piston 42 through a suitable stuffing box 54 forming part of or secured to the cylinder of the servo-motor, said sleeve 53 accordingly partaking of the vertical movements of the piston 42. At its upper end the sleeve 53 is provided with an internal recess 55 in which a plunger 56 is slidable, said plunger projecting outwardly beyond said recess 55 through a stuffing box 57 at the outer end of said sleeve, as shown in Fig. 11; a valve stem 58 extends downwardly from the plunger 56 through the axial bore 59 of the sleeve 53 and at its lower end carries the pilot valve 60 slidably mounted in the valve chamber 48. The pilot valve 60 is reduced at its central portion to provide an annular passageway 61 between itself and the wall of the valve chamber 48, said passageway 61 being closed at its opposite ends by the relatively enlarged end portions or heads 62 and 63 of the valve 60, which end portions slidably fit the valve chamber 48 in a fluid tight manner; in addition, the pilot valve 60 is provided with one or more longitudinally extending conduits 64, which establish communication between the opposite end portions of the valve chamber 48.

Fluid under pressure for operating the servo-motor 41 is supplied by a low pressure pump 65 through a pipe 66 which leads to the annular passageway 51, as shown in Figs. 11 and 12, said pump 65 receiving its fluid from an expansion tank 67 with which it is connected by a pipe 68; the expansion tank 67 also communicates with the motor 24 by means of a pipe 68a, while a branch pipe 69 leads to a conventional spring loaded relief valve 69a and from said valve to the pump 26 as illustrated in Figs. 1 and 11. In the example shown in the drawings the pump 65 is driven from the driving shaft 28 of the hydraulic pump 26 by means of a sprocket chain or belt drive 70 as shown in Fig. 1.

The valve stem 58 is connected with a yoke 71 secured upon the upper end of the plunger and 6. An apertured lug 106 projects from one end of the base or carrier 104 for connection with an internally screwthreaded coupling 107 which in turn is in threaded connection with one end of a rod 108; the latter projects through an opening in one end wall of the guide box 105 so as to be slidable therein, and at its other end is connected with a control block 109 which is slidably mounted within the casing 110 of a tripping and locking device, as shown in Figs. 3 and 4. The control block 109 is provided with a lug 111 depending from the straight horizontal section 112 of said block, and with a notch 113, said lug 111 and notch 113 being located in spaced relation to each other; at a point between the lug 111 and notch 113 the control block 109 is cut away to form a straight section 114 and a shoulder 115 as illustrated in Fig. 3. In addition, the control block 109 includes a projection 116 extending upwardly therefrom for co-operation with a stop 117 secured upon and depending from the reciprocating table 17 as shown in Fig. 1; in the preferred arrangement the stop 117 is mounted so as to be adjustable lengthwise of the table 17, suitable provision being made, for instance in the form of a set screw 118, for fixing said stop 117 in an adjusted position. The control block 109 is further connected with suitable control mechanism illustrated in the form of an operating rod 119 slidably mounted in a stationary bearing 120 and connected by means of a link 121 with an operating lever 122; the latter is pivoted at 123 upon the frame 15 of the machine and is provided at its free end with a handle 124 to facilitate manual manipulation of the control mechanism. A spring 125 surrounds the rod 108 and has its opposite ends in engagement respectively with the guidebox 105 and the control block 109, said spring 125 under certain conditions exerting a tension tending to urge the block 109 toward the left in Fig. 1.

The casing 110 of the previously mentioned tripping mechanism is provided with a recess 126 in which a block detent 127 is vertically slidable, said detent being rigidly secured to a tripping member 128 vertically slidable in the casing 110 and projecting upwardly beyond the same, as shown in Figs. 1, 3 and 4. At an intermediate point the member 128 carries a fixed head 129 vertically slidable in a recess 130 formed in the casing 110 and constituting an abutment for one end of a spring 131, the other end of which engages the bottom of the recess 130, as shown in Figs. 3 and 4. The spring 131, in co-operation with the head 129, exerts an upward tension on the member 128 whereby the detent 127 is maintained in engagement with the lower edge surface of the control block 109. To facilitate the assembling and disassembling of the tripping mechanism, the casing 110 may be provided with removable side and top covers 132 and 133, respectively. The tripping member 128 preferably has its upper end bevelled or pointed, and projects into the path of stops 134 and 135, which depend from the table 17 and are preferably adjustable lengthwise thereof. The stops 134 and 135 may be fixed in their adjusted positions in any suitable manner, as by means of set screws 136 and 137 respectively.

In practice, during operative periods of the machine in which the novel features are embodied, the hydraulic pump 26 will be operated by the motor 27 to rotate the barrel 29 and with it the swash plate 34 and tilting box 35, and their associated elements. With the parts in the position illustrated in Fig. 11 in which the swash plate 34 and the tilting box 35 extend transversely at right angles to the driving shaft 28 or, in other words, occupy a neutral position, no oil will be pumped through the pipes 25 by the pump 26, and the hydraulic motor 24 will accordingly remain stationary; the table 17 or its equivalent is thus at rest. When the tilting box 35 and the swash plate 34 are, however, adjusted to inclined positions, in diagonal relation to the aforesaid driving shaft 28 in the manner to be more fully set forth hereinafter, the pistons 31 will be reciprocated in the cylinders 30 and accordingly will pump oil through the pipes 25 to thereby actuate the pistons of the hydraulic motor 24, the swash plate of which, as previously stated herein, preferably occupies a fixed inclination to the shaft 23 of the motor 24. Under such conditions, the gearing 22, 21, 20, will be operated and in turn will actuate the operating screw 19 to cause the latter, in co-operation with the nut 18, to move the table 17 or its equivalent in one direction or the other, dependent upon the direction of inclination of the swashplate 34 and tilting box 35 relatively to the driving shaft 28 of the hydraulic pump 26. The amount of oil delivered by the hydraulic pump 26 during each complete revolution of the barrel 29 and the consequent speed of operation of the hydraulic motor 24 will depend upon the angular degree of inclination to which the tilting box 35 and swash plate 34 of the hydraulic pump 26 are adjusted. It will be understood that the pipes 25 serve as delivery and return pipes alternately, in accordance with the aforesaid direction of inclination of said tilting box 35 and swash plate 34 of the hydraulic pump 26.

In Fig. 1 of the drawings, the parts of the controlling means occupy neutral positions corresponding to the neutral positions of the parts of the hydraulic pump 26 and its associated elements illustrated in Fig. 11, so that at this stage the table 17 or its equivalent is stationary.

To start the operation, the lever 122 is moved to the right in Fig. 1, so that a corre- 56 by means of a nut 72, said yoke 71 including a stop 73 extending between and laterally beyond spaced shoulders 74 comprising parts of a stop bracket 75 carried by the sleeve 53 as shown in Fig. 6. The yoke 71 is arranged and dimensioned to receive the forked end 76 of an arm 77 which is thereby connected with the valve stem 58 for controlling and operating the pilot valve 60 as will appear more fully hereinafter. The opposite end of the arm 77 is provided with a tubular boss 78 adapted to accommodate the end of a stem 79 which is screwthreaded to receive nuts 80 whereby said arm 77 and stem 79 are secured in fixed connection with each other as illustrated in Figs. 5 and 6. As shown in these figures the stem 79 projects upwardly from and comprises a part of a sliding block 81 slidably mounted in a guide 82 carried by a bracket 83 which is suitably secured in the proper position to the cylinder of the servo-motor 41. At its lower end the sliding block is forked to provide a mounting for a roller 84 arranged in rolling engagement with a cam slide 85 for the purpose to be more clearly set forth hereinafter. In order to maintain the roller 84 in the desired rolling contact with the cam slide 85, springs 86 are located upon opposite sides of the block 81 and are connected at one end with rods 87 projecting outwardly, in opposite directions, from the arm 77, while their other ends are secured to similarly arranged rods 88 extending in corresponding directions from the bracket 83 as shown in Figs. 5 and 6.

As illustrated in Figs. 1, 5 and 7 the cam slide 85 comprises a lower horizontal section $a$, an intermediate horizontal section $b$, and an upper horizontal section $c$, the sections $a$ and $b$ being connected by an inclined section $d$, and the sections $b$ and $c$ being connected by an inclined section $e$; the arrangement is such that the cam slide has a step-like form in which the horizontal sections $a$, $b$ and $c$ are located at progressively higher levels. The cam slide 85 further includes a member 89 vertically adjustable relatively to the horizontal section $b$ and projecting downwardly into a recess formed interiorly of the cam slide 85 as shown in Fig. 7.

Any suitable means may be provided for adjusting the member 89 and for fixing it in an adjusted position, said means preferably including some arrangement whereby the adjustment or setting of said member 89 is visibly indicated. For instance, as shown in the drawings, the aforesaid internal recess may have a cross-sectional form corresponding to that of an inverted keyhole and consist of a cylindrical portion 90 and an adjacent reduced rectangular portion 91, and the adjusting means may comprise a cylindrical plug 92 slidably mounted in the cylindrical portion 90 of the recess and carrying a projection 93 extending radially outward from said plug 92 and slidably mounted in the rectangular reduced portion 91 of said recess. In such case the projection 93 may be bevelled in the direction of the axis of the plug 92 in one direction as indicated at 94 for engagement with the correspondingly bevelled lower end surface of the member 89 as illustrated in Fig. 7; convenient means may be provided for maintaining the bevelled end surface of the member 89 in engagement with the bevelled surface 94 of the projection 93 or the weight of the member 89 may be relied upon alone to effect this result by gravity. The reciprocation of the plug 92 in the cylindrical portion 90 of the recess may be accomplished in any convenient and suitable manner; for instance, as illustrated in Fig. 7 the plug 92 may be provided with a threaded extension 95 in threaded engagement with an internally screw-threaded sleeve 96, the latter being provided with an annular flange 97 fitting against an annular shoulder 98 as shown in Fig. 7. A ring 99 surrounds the sleeve 96 in abutting engagement with the annular flange 97 and in co-operation with the aforesaid annular shoulder 98 fixes the sleeve 96 against axial displacement without interfering with its rotative movements on the cam slide 85; the ring 99 is secured in place by means of screws or the like 100. The sleeve 96 at its outer end is provided with a head 101 to facilitate the rotation of said sleeve, it being understood that the plug 92 will be held against rotation in the cylindrical portion 90 by the co-operation of the portion 91 with the projection 93; with this arrangement it will be obvious that, as the sleeve 96 is rotated in one direction or the other, the plug 92 and projection 93 will be shifted lengthwise in the portions 90 and 91 of the aforesaid recess, with the result that the member 89 will be vertically adjusted relatively to the section $b$ of the cam slide 85 by the action of the bevelled surface 94 and the correspondingly bevelled end surface of said member 89. The latter is preferably bevelled as indicated at 89' to facilitate the travel of the roller 84 to the upper end surface of said member 89 for the purpose to be more fully set forth hereinafter. In order to visibly indicate the setting or adjustment of the member 89 the peripheral surface of the head 101 may be provided with graduations 102 constituting a scale adapted to co-operate with a pointer or indicator 103 projecting over said peripheral surface and fixed in place in any suitable manner as by means of one of the screws 100 in the manner illustrated in Fig. 7.

The cam slide 85 projects upwardly from a base or carrier 104 which is slidably mounted in a suitable guiding means illustrated in the form of a guide box 105 fixed in the proper position, for instance, upon the casing of the hydraulic pump 26, as shown in Figs. 1, 2, 5 by moves the plunger 56 and valve stem 58 downwardly to correspondingly shift the pilot valve 60 downwardly in the valve chamber 48. The lateral branch of the conduit 46 is thereby brought into communication with the radial channel 52, so that the pressure fluid supplied by the low pressure pump 65 will pass through said conduit 46 into the upper chamber 44 of the servo-motor 41. The pressure of this fluid in said chamber 44 will accordingly be exerted in a downward direction upon the upper end of the piston 42 of said servo-motor 41 and accordingly will move the control shaft 39 downwardly and adjust the tilting box 35 and the swash plate 34 of the hydraulic pump 26 to an inclined position in diagonal relation to the driving shaft 28 of said pump 26. At this stage the pump 26 will be in full stroke on the reverse and accordingly will bring about an operation of the hydraulic motor 24 and the gearing 22, 21, 20, to actuate the operating screw 19, which operation causes the table or its equivalent to be moved lengthwise of the horizontal guiding means 16. This adjustment of the parts is such that in the illustrated machine the table 17 will be moved at high speed in a direction reverse to its operative movement or to the right in Fig. 1, as indicated by the dotted arrow therein. This reverse or return movement of the table 17 continues until the stop 117 engages the projection 116, whereupon the control block 109 will be moved to the right in Figs. 1 and 3 until the detent 127 snaps into position behind the shoulder 115. This right hand movement of the block 109 in Fig. 1 will cause a corresponding movement of the cam slide 85, and consequently causes the roller 84 to travel from the section $a$ up the incline $d$ to the horizontal section $b$. The pressure fluid from the low pressure pump is thereby again permitted to travel through the conduit 46 to the upper chamber 44 of the servo-motor 41, whereby the piston 42 and control shaft 39 are moved downwardly a distance sufficient to restore the tilting box 35 and swash plate 34 of the hydraulic pump 26 to the neutral position shown in Fig. 11. The operation of the hydraulic motor 24 is consequently arrested and the operation of the table 17 or its equivalent is arrested, with the parts all again in the position indicated in Fig. 1. The machine is now ready for another cycle of operations and may be started at will by operating the lever 122 toward the right in Fig. 1, as previously described herein.

It will be understood, with each operation of the pilot valve 60 of the servo-motor 41 in upward and downward directions in the valve chamber 48 to cause the servo-motor piston 42 to be moved either upwardly or downwardly, that these movements of said piston 42 continue until the lateral branches of the conduits 46 and 47 register respectively with the heads 62 and 63 of said pilot valve whereby communication between the conduits 46 and 47 and the pipe 66 leading to the low pressure pump 65 is cut off; at the same time, it will be obvious that the extent of movement of the pilot valve 60 is determined by the travel of the stop 73 between the stops 74 of the bracket 75. The operation of the servo-motor piston 42 is thus dependent upon the extent of movement of the pilot valve 60 in the valve chamber 48, and is always sufficient to effect the adjustment of the swashplate 34 and tilting box 35 of the hydraulic pump 26 necessary to bring about the desired operations.

With the adjusting mechanism for the member 89, as illustrated in Fig. 7, which corresponds to the arrangement shown in Figs. 1, 5 and 6, the speed of travel of the table or its equivalent in a forward direction is varied during a predetermined period of such travel by the vertical adjustment of the member 89 through the medium of the projection 93 and its associated elements; as previously set forth herein, the period during which the speed of travel may be varied may constitute the time during which the machine in which the novel features are incorporated performs its operative functions.

In Fig. 9 of the drawings a corresponding adjusting or controlling means is shown whereby the speed of travel of the table 17 or its equivalent in a return or reverse direction may be varied and regulated by an adjustment of the member 89a, which corresponds to the member 89 of Fig. 7. The principal difference existing between the two mechanisms illustrated in Figs. 7 and 9 resides in the fact that the bevelled surface 94a and the correspondingly bevelled lower end of the member 89a are inclined in directions opposite to the inclination of the same surfaces in Fig. 7; otherwise, the construction and operation of the mechanism shown in Fig. 9 may be the same as illustrated in Fig. 7. As shown in Fig. 9 the cam slide 85a, which corresponds in function to the cam slide 85 of Fig. 7 may include an additional horizontal section $b^2$ connected with the horizontal section $b$ by an inclined section $b'$; the section $b^2$ in co-operation with the roller 84 and associated elements serves to provide for an additional change in the speed of travel of the table.

In order to enable the speed of the table 17 during predetermined periods in either direction of its travel to be varied, the arrangement shown in Fig. 10 may be provided. As shown in this figure, two members 89b and 89c are mounted in the cam slide 85b, so as to be vertically adjustable relatively to the horizontal section $b^3$, which corresponds to the section $b$ of Fig. 7, and to an added horizontal section $f$, which is connected with the sponding push will be exerted upon the operating rod 119, which will be transmitted to the control block 109 and thereby cause the latter to be correspondingly moved relatively to the casing 110 toward the right in Figs. 1 and 3. During this actuation of the parts the straight horizontal section 114 of the control block 109 will travel across and relatively to the detent 127 until the latter snaps into the recess 113 whereupon the movement toward the right in Figs. 1 and 3 will be arrested. At the same time the described operation of the parts will exert a corresponding push to the right in Figs. 1 and 3 upon the rod 108, which movement will compress the spring 125 and be transmitted to the base or carrier 104 and will correspondingly shift the cam slide 85 to the right in Fig. 1 to cause the roller 84 to travel from the horizontal section $b$ up the inclined section $e$ to the relatively higher horizontal section $c$ of the cam slide 85. This operation moves the block 81 and arm 77 in an upward direction and correspondingly moves the plunger 56 and valve stem 58 upwardly to shift the pilot valve 60 in an upward direction in the valve chamber 48. This brings the lateral branch of the conduit 47 into communication with the radial channel 52 and accordingly permits the pressure fluid from the low pressure pump 65 to pass through the conduit 47 to the chamber 45 at the lower end of the casing of the servo-motor 41. The pressure of this fluid is thus exerted in an upward direction against the lower end of the piston 42 and moves the latter upwardly in the casing of the servo-motor 41, which movement results in a corresponding actuation of the control shaft 39 and brings about an adjustment of the tilting box 35 and swash plate 34 of the hydraulic pump 26 to an inclined position relatively to the driving shaft 28. This adjustment of the parts is such that the resulting operation of the hydraulic motor 24, gearing 22, 21 and 20, and the operating screw 19 and nut 18, causes the table 17 or its equivalent to be moved in a forward or operative direction at high speed, as indicated by the full line arrow in Fig. 1. The milling cutter or its equivalent is thus caused to quickly approach the work or the position which corresponds thereto. Just before this condition is reached, that is to say, just before the milling cutter engages the work, the stop 134 comes into contact with the tripping member 128 and depresses the same against the tension of the spring 131 to correspondingly depress the detent 127, and move it out of the notch 113 a distance just sufficient to enable the straight section 114 of the control block 109 to travel across said detent 127 until the latter is engaged by the shoulder 115, whereupon the movement of the block 109 in the indicated direction ceases. It will be understood that the spring 125 has been compressed by the previous operations of the block 109 and accordingly now exerts a tension whereby the movement of the block 109 just described is brought about, and the position of the parts indicated in Fig. 3 is reached.

The operations of the parts just described brings about a corresponding movement of the cam slide 85 to the left in Figs. 1 and 7, so that the roller 84 descends from the section $c$ down the incline $e$ and comes to rest upon the top of the member 89 in the position indicated in Fig. 7. These movements of the roller 84 are transmitted by the block 81 and arm 77 to the plunger 56 and valve stem 58, whereby the pilot valve 60 is again moved downwardly in the valve chamber 48 to permit the pressure fluid from the low pressure pump 65 to pass through the conduit 46 to the upper chamber 44 of the servo-motor 41. The piston 42 is thereby again shifted downwardly to correspondingly actuate the control shaft 39 and adjust the tilting box 35 and swash plate 34 of the hydraulic pump 26 to an inclined position which in the illustrated example is nearer the neutral position shown in Fig. 11, whereby the speed of the hydraulic motor 24 is reduced to a corresponding degree. The forward speed of the table 17 in the direction of the solid arrow in Fig. 1 is accordingly also reduced, so that the work is fed at the desired operating speed while the milling cutter is operating, or corresponding relatively slower operative movements are produced in equivalent elements of machines other than the milling machine shown in the illustrated example. By adjusting the position of the member 89 through the medium of the projection 93 and adjusting sleeve 96 and associated elements, the speed at which the table 17 or its equivalent is caused to travel in an operative movement or during any other operative period, may be accurately regulated to produce the most efficient results.

The described forward or operative movement of the table 17 or equivalent element at reduced speed is continued until the stop 135 engages the tripping member 128 and forces it downwardly against the tension of the spring 131 to move the detent 127 downwardly beyond the shoulder 115, whereupon the control block 109 is moved to the left in Fig. 3 by the action of the spring 125 until the lug 111 engages said detent 127. This results in a corresponding movement of the cam slide 85 and causes the roller 84 to travel from the horizontal section $b$ down the inclined section $d$ to the relatively lower horizontal section $a$ of the cam slide 85 which causes a similar downward movement of the block 81 and arm 77 under the influence of the springs 86. This downward movement of the arm 77 is transmitted by the forked end 76 of the latter to the yoke 71, and theresection $b^3$ by an inclined section $g$. The projection 93a which corresponds to the projection 93 of Fig. 7 is bevelled in opposite directions, as indicated at 94b and 94c for co-operation with the correspondingly bevelled end surfaces of the members 89b and 89c respectively. The construction and operation of the arrangement shown in Fig. 10 may otherwise be the same as previously described, and as a matter of fact, constitutes a combination of the two arrangements shown in Figs. 1 and 9 respectively.

While the features of the novel constructions have been illustrated and described with respect to milling machines, it will be understood that they may be embodied with equal efficiency in any machine which includes a reciprocating operating element arranged to assist in the performance of the functions for which the machine is designed. As an example of the type of machines in which the invention may be successfully embodied to increase the efficiency thereof, may be mentioned planers, broaching machines, drilling machines, and shapers; the specification and claims are to be construed accordingly.

In any case, the novel arrangements provide for accurate and efficient control of the machines for which they are adapted and enable the operation of the reciprocating elements of such machines to be accurately regulated in accordance with any predetermined operative sequence. The particular advantage of the novel construction resides in the fact that only one hydraulic driving mechanism is used, and that only a single hydraulic pump is required to effect the desired results.

Various changes in the specific forms shown and described may be made within the scope of the claims without departing from the spirit of the invention.

I claim:

1. The combination of a reciprocable machine element, hydraulic driving mechanism of variable speed for reciprocating said element, a servo-motor for adjusting said driving mechanism to vary the speed thereof, a pilot valve in said servo-motor, a cam slide provided with controlling faces at different horizontal levels for actuating said pilot valve to determine the operation of said servo-motor, adjustable means whereby the horizontal plane of one of said faces is changed to vary the operative effect of said face upon said pilot valve, means for adjusting said cam slide, and means carried by said machine element for controlling said adjusting means whereby the servo-motor is caused to adjust said driving mechanism to automatically vary the speed of travel of said element at predetermined stages in a given direction of movement thereof.

2. The combination of a reciprocable machine element, hydraulic driving mechanism of variable speed for reciprocating said element, a servo-motor for adjusting said driving mechanism to vary the speed thereof, a pilot valve in said servo-motor, a cam slide provided with controlling faces at different horizontal levels for actuating said pilot valve to determine the operation of said servo-motor, a member carried by said cam slide and adjustable relatively to one face thereof, means carried by said cam slide for adjusting said member to change the horizontal plane of said face whereby the operative effect thereof upon said pilot valve is varied, a control block for adjusting said cam slide, tripping means controlling the operation of said control block, and means carried by said machine element for actuating said tripping means whereby the servo-motor is caused to adjust said driving mechanism to automatically vary the speed of travel of said element at predetermined stages in a given direction of movement.

3. The combination of a reciprocable machine element, reversible hydraulic driving mechanism of variable speed for reciprocating said element, a servo-motor for adjusting said driving mechanism to vary the speed and direction thereof, a pilot valve in said servo-motor, a cam slide provided with operating faces located in different horizontal planes for actuating said pilot valve to determine the extent and direction of operation of said servo-motor, a member carried by said cam slide and adjustable relatively to one face thereof to vary the operative effect of said face upon said pilot valve, said member being provided with a bevelled end face, a projection correspondingly bevelled engaging the bevelled end face of said member, means carried by said cam slide for shifting said projection to adjust said member relatively to said face, a spring controlled control block provided with a lug and a plurality of notches, a spring controlled detent co-operating with said lug and notches to determine the operation of said control block, and means carried by said machine element whereby said detent is actuated and the servo-motor is caused to adjust said driving mechanism to automatically determine the direction of travel of said element and to automatically vary the speed thereof at predetermined stages in a given direction of movement of said element.

4. The combination of a reciprocable machine element, reversible hydraulic driving mechanism of variable speed for reciprocating said element, a servo-motor for adjusting said driving mechanism to vary the speed and direction thereof, a pilot valve in said servo-motor, a cam slide provided with operating faces located in different horizontal planes for actuating said pilot valve to determine the extent and direction of operation of said servo-motor, a control block operatively connected with said cam slide, said control block being provided with a plurality of notches, a lug depending from said control block, a projection extending upwardly from said control block, a compressible spring adapted to move said control block in one direction, a stop adjustably carried by said machine element co-operating with said projection to move said control block in the opposite direction, the movements of said control block being transmitted to said cam slide, a detent co-operating with said notches and lug to determine the extent of movement of said control block and cam slide, a spring controlled tripping member connected with said detent and adjustable stops carried by said machine element and co-operating with said tripping member to operate said detent and release said control block whereby the servo-motor is caused to adjust said driving mechanism to automatically determine the direction of travel of said element and to automatically vary the speed thereof at predetermined stages in a given direction of movement of said element.

5. The combination of a reciprocable machine element, hydraulic driving mechanism of variable speed for reciprocating said element, a servo-motor for adjusting said driving mechanism to vary the speed thereof, a pilot valve in said servo-motor, a cam slide provided with operating faces in different horizontal planes for actuating said pilot valve to determine the operation of said servo-motor, a member carried by said cam slide and vertically adjustable relatively to one face thereof for varying the operative effect of said face upon said pilot valve, said member having a bevelled end face, a correspondingly bevelled projection engaging the bevelled end face of said member carried by said cam slide, a plug carrying said projection and slidably mounted in said cam slide, means for slidably adjusting said plug to vertically adjust said member, means on said cam slide for visibly indicating said adjustment, means for adjusting said cam slide to effect an adjustment of said pilot valve, and means carried by said machine element for controlling said adjusting means whereby the servo-motor is caused to adjust said driving mechanism to automatically vary the speed of travel of said element at predetermined stages in a given direction of movement thereof.

6. The combination of a reciprocable machine element, reversible hydraulic driving mechanism of variable speed for reciprocating said element, a servo-motor for adjusting said driving mechanism to vary the speed and direction thereof, a pilot valve in said servo-motor, a cam slide provided with a plurality of faces located in different horizontal planes for controlling the operation of said pilot valve to determine the extent and direction of movement of said servo-motor, a plurality of members carried by said cam slide and adjustable relatively to a plurality of the faces thereof to vary the operative effect of said faces on said pilot valve, said members having end faces bevelled in opposite directions, a projection correspondingly bevelled in opposite directions and engaging the bevelled end faces of said members, means mounted on said cam slide and carrying said projection for shifting the latter to adjust said members, means for adjusting said cam slide to effect an operation of said pilot valve, and means carried by said machine element for controlling said adjusting means whereby the servo-motor is caused to adjust said driving mechanism to automatically determine the direction of travel of said element and to automatically vary the speed thereof at predetermined stages in a given direction of movement of said element.

In testimony whereof I have hereunto set my hand.

ARTHUR L. ELLIS.